United States Patent [19]
Merola

[11] 3,780,923
[45] Dec. 25, 1973

[54] GRIPPING DEVICE
[75] Inventor: Anthony Merola, Pittsburgh, Pa.
[73] Assignee: Amerola Products Corporation, Pittsburgh, Pa.
[22] Filed: Oct. 28, 1971
[21] Appl. No.: 193,599

Related U.S. Application Data
[62] Division of Ser. No. 825,369, May 16, 1969, Pat. No. 3,653,708.

[52] U.S. Cl.................. 226/151, 74/25, 294/102 R
[51] Int. Cl............................................. B65h 17/10
[58] Field of Search............... 294/102 R, 114, 116; 24/263 SW; 74/25; 226/165, 166, 167, 151; 254/104, 106, 31

[56] References Cited
UNITED STATES PATENTS
| | | | |
|---|---|---|---|
| 901,925 | 10/1908 | Thompson | 294/114 X |
| 1,431,928 | 10/1922 | Brown | 294/114 |
| 3,298,666 | 1/1967 | Prange | 226/162 X |
| 3,473,393 | 10/1969 | Zaruba | 74/25 |
| 3,556,376 | 1/1971 | Offterdinger | 294/102 X |

*Primary Examiner*—Evon C. Blunk
*Assistant Examiner*—Johnny D. Cherry
*Attorney*—Parmelee, Utzler & Welsh

[57] ABSTRACT

A gripping device is provided that has a pair of roller support members attached to a support means, the support members having confronting converging roller surfaces, with a resiliently secured roller on each surface in confronting relationship to the other roller. Motion of a member frictionally secured between the rollers in a direction away from the direction of convergence of the surfaces is easily achieved while any movement of the member in the direction of convergence of the surfaces causes a secure gripping of the member restraining it from such movement.

9 Claims, 7 Drawing Figures

PATENTED DEC 25 1973 3,780,923

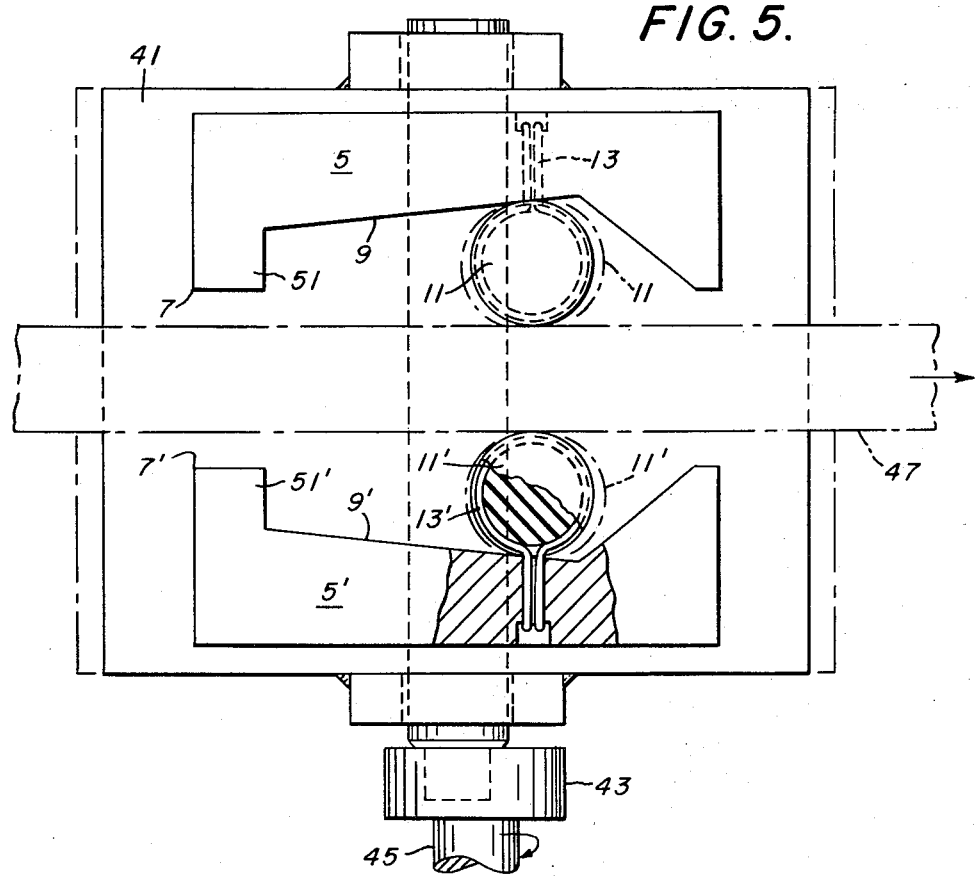
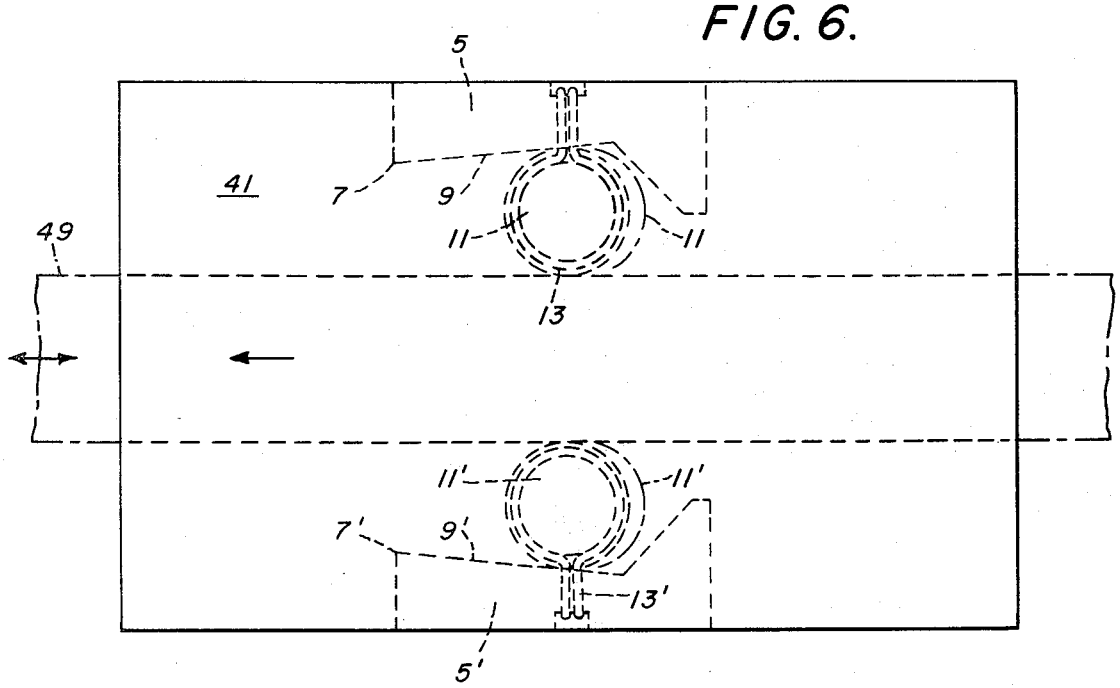

GRIPPING DEVICE

This is a divisional application of application Ser. No. 825,369, filed May 16, 1969, now U.S. Pat. No. 3,653,708.

BACKGROUND OF THE INVENTION

Devices for gripping and securely holding a workpiece are as numerous as the different uses to which such devices may be put. Usually, a specific clamp or gripping device is engineered for a specific use. Often such devices are complex, have a great many moving parts that must be maintained in good operating condition, and are unsuited other than for some specific use.

I have invented a gripping device that is of simple construction, requires minimum operating procedures and can be used for a multitude of different purposes on workpieces such as sheets of metal, paper, or cloth, plates of metal or the like, rods or conduits, and is even adaptable for use as a transfer mechanism where reciprocating motion is provided for either the gripping device or a cooperating rail or bar.

SUMMARY OF THE INVENTION

According to the present invention a gripping device is provided having a pair of roller support members held in spaced relation by a support means, the roller support members having confronting converging roller surfaces that terminate spaced from each other, and a resiliently secured roller on each surface, the rollers being in confronting relation in rest position and adapted to frictionally secure a workpiece inserted between the rollers. When a workpiece such as a plate, sheet or rail is placed between and frictionally engaged by the rollers, movement of the workpiece in the direction of divergence of the surfaces causes the rollers to roll on said surfaces increasing the space between the confronting rollers, but any attempt to move the workpiece in the direction of convergence of the surfaces will cause the rollers to roll on the surfaces in converging relation decreasing the space between the rollers and resulting in more secure gripping of the workpiece by the rollers.

BRIEF DESCRIPTION OF THE DRAWINGS

FIG. 5 is a top plan view of another embodiment of the present invention where the gripping device is subjected to a reciprocal motion so as to advance a bar or rail by alternate gripping and releasing of the rail; and FIG. 6 is a top plan view of another embodiment of the present invention where a rail having the gripping device thereon is subjected to a reciprocal motion so as to advance the gripping device by alternate gripping and releasing of the rail by the device.

DETAILED DESCRIPTION

Figure 1:
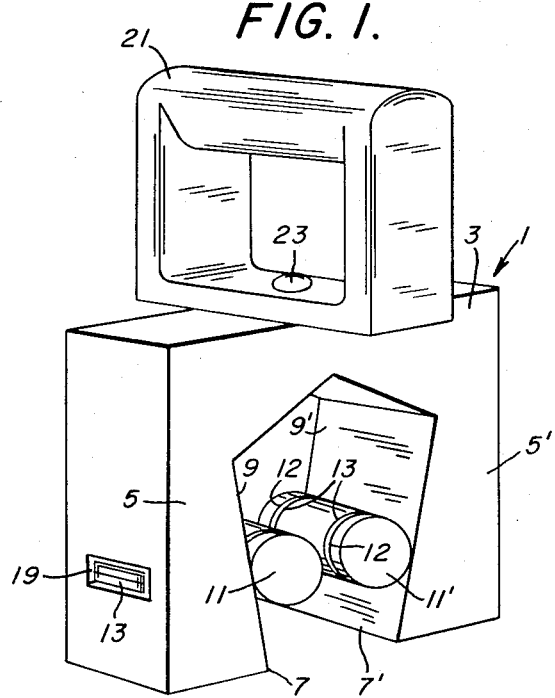
FIG. 1 is a perspective view of the gripping device of the present invention in the form of a hand gripper.

Referring now to FIG. 1, there is illustrated the gripping device 1 of the present invention in the form of a hand gripper for sheet or plate material. A pair of roller support members 5 and 5' are maintained in opposed spaced relation by a support means 3, herein illustrated as a bridge between two ends of the support members. The support members terminate at 7 and 7' in spaced relation and have confronting converging roller surfaces 9 and 9', converging in the direction of the terminals 7 and 7'. Positioned on each roller surface 9 and 9' is a friction roller 11 and 11' respectively which are resiliently secured to the surface 9 and 9' by means of resilient securing means 13, herein illustrated as rubber strips. Preferably the resiliently securing means 13 are recessed in grooves 12 of the rollers 11 and 11' so as to provide a relatively smooth surface on the rollers. The rollers 11 and 11', herein illustrated as formed from rubber, are resiliently secured to the roller surfaces in confronting relation to each other. For convenience, a handle means 21 is attached by a bolt 23 or other securing means to enable ready lifting of the gripping device. If desired, depressions 19 may be formed in the outer wall of the roller support members to provide protection for the resilient means 13 against abrasion which might occur if the resilient means were exposed.

Figure 2:
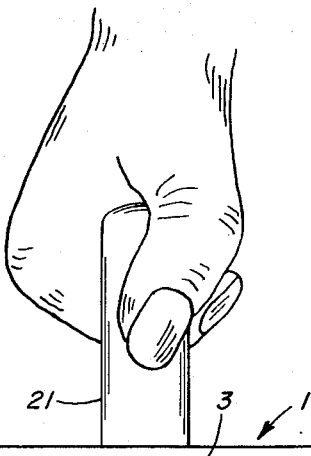
FIG. 2 is a side elevational view of the gripping device shown in FIG. 1 with a workpiece hold thereby.

The operation of the gripping devices is shown in FIG. 2, wherein a workpiece, here illustrated as a metallic plate 15 has been inserted between the terminals 7 and 7' of the gripping device 1 and between the confronting friction rollers 11 and 11'. The workpiece 15 urges the rollers 11 and 11' in the direction away from the teminals. The thickness of the plate is at least as great as to the spacing between the rollers. The rollers 11 and 11' roll on the surfaces 9 and 9' in a direction away from the terminals 7 and 7' but, because of resilient means 13, will frictionally secure the workpiece. Any movement of the workpiece 15 in the direction of convergence of the surfaces 9 and 9' will cause the rollers 11 and 11' to roll towards terminals 7 and 7' decreasing the spacing between the rollers and thus causing a tighter grip on the workpiece. When carrying a workpiece 15, such as illustrated in FIG. 2, the weight of the workpiece 15 will cause movement of the rollers in the direction of convergence of the surfaces 9 and 9' and the weight of the workpiece itself causes a more secure gripping thereof by the gripping device.

Figure 3:
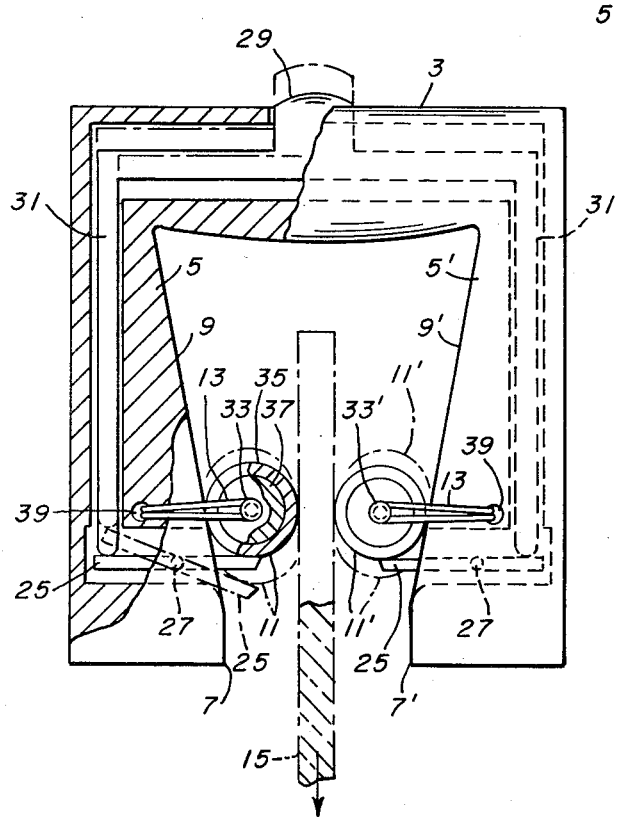
FIG. 3 is aside elevational view with cutaway portions of another embodiment of the gripping device of the present invention having a releasing means on the device and an alternate method of securing the resilient securing means to the rollers.

To remove the workpiece from the gripping device the workpiece can be moved, until free of the rollers, in the direction of the horizontal axes of the rollers or released merely by holding the workpiece stationary and urging the rollers in the direction of devergence of the surfaces 9 and 9', in which case the spacing between the rollers is increased and the workpiece released from its frictional securement. Such urging can be done either manually or by a releasing means on the roller support members. One such releasing means is illustrated in FIG. 3, wherein the support means 3 also serves as the handle for the gripping device. Releasing means is illustrated as plunger 29 having arms 31 which are provided within a space in the roller support members 5 and 5' and operate a releasing lever 25 pivotally mounted on a pin 27. When the releasing means is at rest, the ends of arms 31 rest on the lever 25. To release a workpiece 15 from the gripping device, the plunger 29 is forced downwardly, thereby pivoting the exposed end of lever 25 upwardly to urge rollers 11 and 11' in the direction of divergence of the surfaces 9 and 9', increasing the space beween the rollers and releasing the workpiece from its frictional securement, therebetween. Other suitable releasing means are possible such as levers extending completely through the roller support means where the lever could be depressed and urge the rollers, so long as the means provide for the urging of the rollers 11 and 11' in the direction of divergence of the surfaces 9 and 9'.

The rollers in FIG. 3 are illustrated as metallic cylinders 37 having a rubber sleeve or outer ring 35. An optional resilient securing means is also illustrated in FIG. 3 wherein the metallic cylinders 37 have pins 33 extending from both ends of the cylinder at its horizontal axis with the resilient means 13 secured to the pins 33, and passed through apertures 39 in the roller support members 5 and 5'.

The friction rollers are adapted to frictionally engage a workpiece inserted therebetween. The rollers may be of a hard rubber material that provides good frictional engagement and a degree of displacement thereof for added frictional securing of the workpiece. The rollers can be made of other materials such as metallic cylinders having a rubber coating or sleeve thereon or metallic cylinders such as aluminum or stainless steel rollers having a serrated or knurled rolling surface to give good frictional engagement between the roller and the workpiece. As illustrated in FIG. 1, the roller may have recesses to receive the resilient securing means, providing a relatively smooth surface. The roller may be a cylinder with concave or convex configuration so as to better grip rounded objects such as pipes, rods, conduits or the like, in which case the roller surfaces 9 and 9' of the roller support members can be made to conform with the configuration of the rollers thereon.

The rollers are resiliently secured to the roller support members, on the roller surfaces thereof, by resilient means such as rubber strips, springs, or other resilient securing means that will allow rolling of the rollers on the surfaces while at the same time urging the rollers back to their confronting rest position. The resilient means, in cooperation with the roller surfaces maintain the longitudinal axes of the rollers generally parallel or coplaner during the roller travel. The rollers, when at rest position and in confronting relation to each other, may contact each other or be spaced apart, depending upon the end use to which the gripping device is to be put. If paper, cloth or other thin sheet material is to be gripped by the gripping device, the rollers can be in contacting relationship and the sheet material pulled between the rollers. When the sheet material has been urged between the rollers it will be secured thereby and, as previously discussed, any attempt to pull the sheet material therefrom will cause the rollers to roll in the direction of convergence of the roller surface and result in a tighter grip. For larger workpieces such as plates of glass or metal, the rollers may be spaced apart at rest position a distance so that the plate only urges the rollers a short distance and will be gripped when inserted between the rollers. Because the rollers become further apart as they roll on their corresponding surfaces when a workpiece urges them in the direction away from the terminals, a single gripping device can be used for varying sizes of items.

Figure 4:
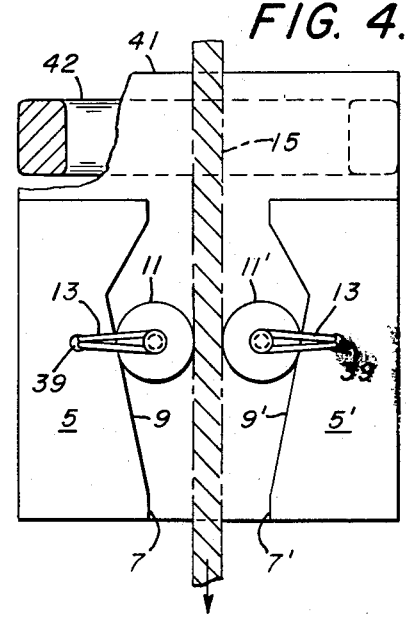
FIG. 4 is a fragmented view of a gripping device of the present invention for use on the vertical edge of a sheet or plate material.

Another embodiment of the present invention is illustrated in FIG. 4 wherein the roller support members 5 and 5' are attached to a support means 41 that comprises a base member. The roller support members 5 and 5' are attached to the base member 41 with the confronting converging surfaces 9 and 9' being generally normal to the base 41, and the rollers 11 and 11' in spaced relation to each other. By having a base member 41 as shown, the gripping device can be used to grip and lift the vertical end of a sheet or plate of glass or metal and the plate need not be gripped from the top or horizontal edge thereof. The gripping device can be placed on the vertical end of the plate and by lifting the gripping device, using preferably a handle 42, on the rear of the base, the rollers 11 and 11' will be forced to roll towards the terminals and tightly grip the edge portion of the plate or workpiece 15 causing it to light also. By providing two such gripping devices, one at each vertical end of the plate, a large plate can be carried relatively easily even though no finger holds or other aids are present on the plate material. The gripping device is released from the workpiece as above described by sliding it transverse the direction of roll of the rollers or by urging the rollers upwardly, enlarging the space therebetween to release the workpiece.

The gripping device has numerous other application, such as those illustrated in FIGS. 5 and 6 where it can be used as a transfer mechanism through its gripping and releasing ability. Referring to FIG. 5, there is illustrated a gripping device similar to that of FIG. 4 wherein the roller support members 5 and 5' are attached to a base 41 with the converging surfaces 9 and 9' generally normal to base 41. The rollers 11 and 11' are resiliently secured to the roller support members and are spaced apart a predetermined distance. Preferably, legs 51 and 51', or other guide means are provided to align a rail with the space between the rollers. The base is then attached to a reciprocating mechanism such as a shaft 45 being rotated by a motor (not shown) and an eccentric 43 adapted to translate the rotational motion of the shaft into a reciprocating motion for the gripping device. The gripping device can then be used to advance a rail or rod 47, in the direction shown by the arrow in the drawing, by a gripping and releasing action caused by the reciprocation of the gripping device in relation to the rail 47. As shown in the FIG. 5, the gripping device, when it is moved in the direction to the right by means (not shown), will carry the rail 47 with it because of the gripping action of the rollers 11 and 11' as they are urged in the direction of convergence of the surfaces 9 and 9'. On the return stroke, to the left, the gripping action of the rollers will be released since the rollers will be urged in the direction opposite convergence of the surfaces 9 and 9', enlarging the distance between the rollers. This releasing will result in retaining of the rail in its advanced position while the gripping device is moved to the left. Thus by a series of reciprocating movements, causing alternate gripping and releasing of the rail, the rail will be advanced in the direction shown.

Figure 7:
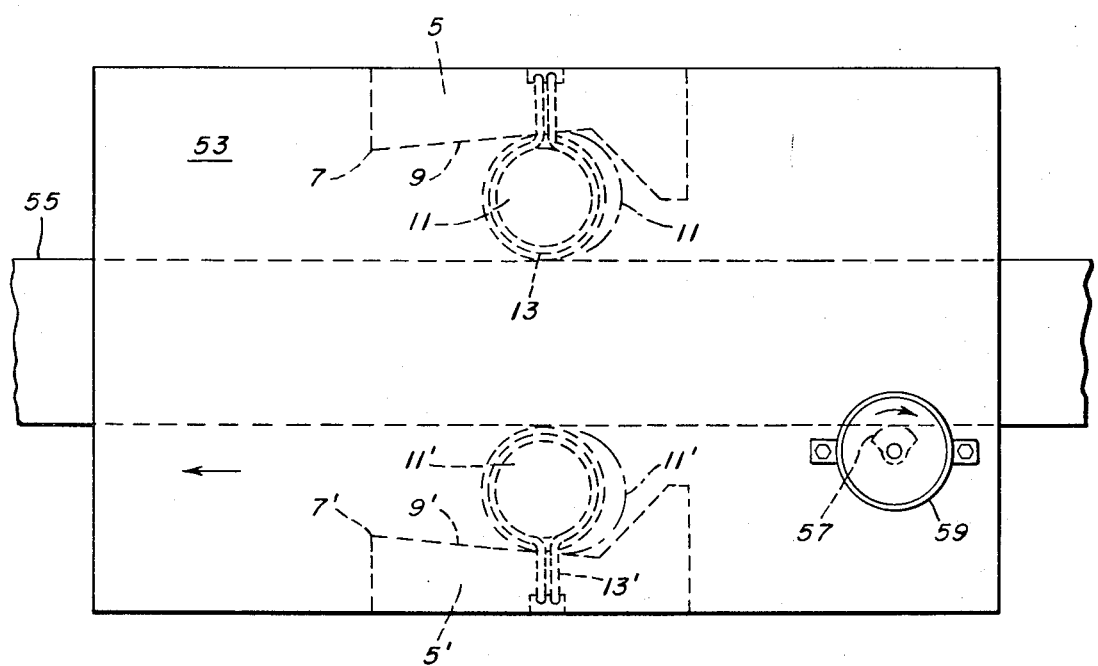
FIG. 7 is a top plan view of another embodiment of the present invention where a gripping device carries a reciprocating means cooperating with a stationary rail to cause advancement of the device along the rail.

The provision of relative reciprocation between a workpiece and the gripping device effects a resultant unidirectional relative movement between the two and may be effected by other means such as described in FIG. 6 where the gripping device can be used as a transfer mechanism for pellets and the like. As shown, a gripping device and a rail 49 are used similar to those described in FIG. 5 but the rail is adapted to reciprocate (by reciprocating means not shown) and through the alternate gripping and releasing of the rail by the gripping device, the gripping device is caused to advance to the left. The alternate gripping and releasing effect caused by the rollers 11 and 11' traveling on the respective converging surfaces 9 and 9' of the rollers support members 5 and 5' advances the gripping device, which may be part of a pallet or have a pallet attached thereto. Also, a stationary rail with a reciprocating means on the gripping device could cause advancement of the device along the rail through the alternate gripping and releasing action of the rollers of the gripping device. As an example of such an arrangement, FIG. 7 illustrates a gripping device 53 mounted on a stationary rail 55, the gripping device having rollers 11 and 11' which travel on converging surfaces 9 and 9'. As illustrated therein, a cam member 57 is carried by the shaft of motor 59, which cam travels in the direction of the arrow shown. With the cam member, alternate movement of the gripping device 53 along stationary rail 55 is effected by alternate contact of the cam surface with the rail. When the cam 57 is not in contact with the gripping device, reciprocation of the device in the direction opposite to the arrow shown on the device is effected, and such reciprocable motion moves the device along the stationary rail.

The relative dimensions of the rail and the spacing between the rollers in their rest position where the gripping device is to be used as a transfer mechanism should be approximately the same, with the rail perhaps being slightly larger than the distance between the rollers to provide a secure placement thereof. Guide means such as inner extending legs 51 may be provided to align the rail with the rollers.

There has been described a gripping device of simple construction that provides frictional securement of a workpiece between confronting rollers. The rollers, being resiliently secured to rollers support members having confronting converging surfaces, securely grip a workpiece inserted therebetween and provide increased gripping when it is attempted to move the workpiece in the direction of convergence of the surfaces, while the workpiece is easily released if moved in the opposite direction. The ready gripping and releasing action of the gripping device also enables its use as a transfer mechanism where reciprocal motion is used to advance either a gripping device on a reciprocating rail, a reciprocating device on a stationary rail, or a rail through a reciprocating gripping device.

I claim:

1. A gripping device comprising
   a. a support means comprising a base member,
   b. a pair of roller support members attached to said base member maintained in opposed spaced relation by said support means and having confronting converging roller sufaces terminating in spaced relation to each other, said surfaces being generally normal to said base member.
   c. a pair of friction rollers,
   d. means for resiliently securing each of said rollers to a said converging surface in a rest position in confronting relation to the other said roller with said rollers spaced apart a predetermined distance, so that a workpiece when inserted through the space between the teminals of said support members and between said confronting rollers will urge said rollers in the direction away from said terminals and be frictionally engaged by said resiliently secured rollers, whereupon movement of the workpiece in the direction of said terminals increases the gripping forces applied by the rollers, and, in combination,
   e. a workpiece disposed therebetween said rollers, and
   f. means for effecting relative reciprocation between the workpiece and the gripping device so as to effect a resultant unidirectional relative movement therebetween.

2. The combination as described in claim 1 wherein the workpiece is reciprocated and the gripping device moves unidirectionally relative to the workpiece.

3. The combination as described in claim 1 wherein the gripping device is reciprocated and the workpiece moves unidirectionally relative to the gripping device.

4. A gripping device comprising
   a. a support means comprising a base member,
   b. a pair of roller support members attached to said base member maintained in opposed spaced relation by said support means and having confronting converging roller surfaces terminating in spaced relation to each other said surfaces being generally normal to said base member,
   c. a pair of friction rollers,
   d. means for resiliently securing each of said rollers to a said converging surface in a rest position in confronting relation to the other said roller with said rollers spaced apart a predetermined distance, so that a workpiece when inserted through the space between the terminals of said support members and between said confronting rollers will urge said rollers in the direction away from said terminals and be frictionally engaged by said resiliently secured rollers, whereupon movement of the workpiece in the direction of said terminals increases the gripping forces applied by the rollers, and
   e. in combination therewith, a rail adapted for reciprocation whereby said gripping device when positioned on said rail, with said rail between said rollers, is by reciprocation of the rail advanced along the rail by alternate gripping and releasing of the reciprocating rail by the gripping device.

5. A gripping device as described in claim 4 wherein alignment means are positioned on said base member to align said rail between said rollers.

6. A gripping device comprising
   a. a support means comprising a base member,
   b. a pair of roller support members attached to said base member maintained in opposed spaced relation by said support means and having confronting converging roller surfaces terminating in spaced relation to each other, said surfaces being generally normal to said base member,
   c. a pair of friction rollers,
   d. means for resiliently securing each of said rollers to said converging surface in a rest position in confronting relation to the other said roller with said rollers spaced apart a predetermined distance, so that a workpiece when inserted through the space between the terminals of said support members and between said confronting rollers will urge said rollers in the direction away from said terminals and be frictionally engaged by said resiliently secured rollers, whereupon movement of the workpiece in the direction of said terminals increases the gripping forces applied by the rollers, and e. in combination therewith, a reciprocating means, and a rail positioned between the rollers, whereby reciprocation of the gripping device advances the rail through said rollers by alternate gripping and releasing of the rail by the rollers of the reciprocating gripping device.

7. A gripping device as described in claim 6 wherein alignment means are positioned on said base member to align said rail between said rollers.

8. A gripping device comprising
   a. a support means comprising a base member,
   b. a pair of roller support members attached to said base member maintained in opposed spaced relation by said support means and having confronting converging roller surfaces terminating in spaced relation to each other, said surfaces being generally normal to said base member,
   c. a pair of friction rollers,
   d. means for resiliently securing each of said rollers to a said converging surface in a rest position in confronting relation to the other said roller with said rollers spaced apart a predetermined distance, so that a workpiece when inserted through the space between the terminals of said support members and between said confronting rollers will urge said rollers in the direction away from said terminals and be frictionally engaged by said resiliently secured rollers, whereupon movement of the workpiece in the direction of said terminals increases the gripping forces applied by the rollers, and
   e. in combination therewith, a reciprocating means and a stationary rail, whereby reciprocation of said gripping device advances the gripping device along said stationary rail by alternate gripping and releasing of said rail by said gripping device.

9. A gripping device as described in claim 8 wherein alignment means are positioned on said base member to align said rail between said rollers.

* * * * *